Figure 1:
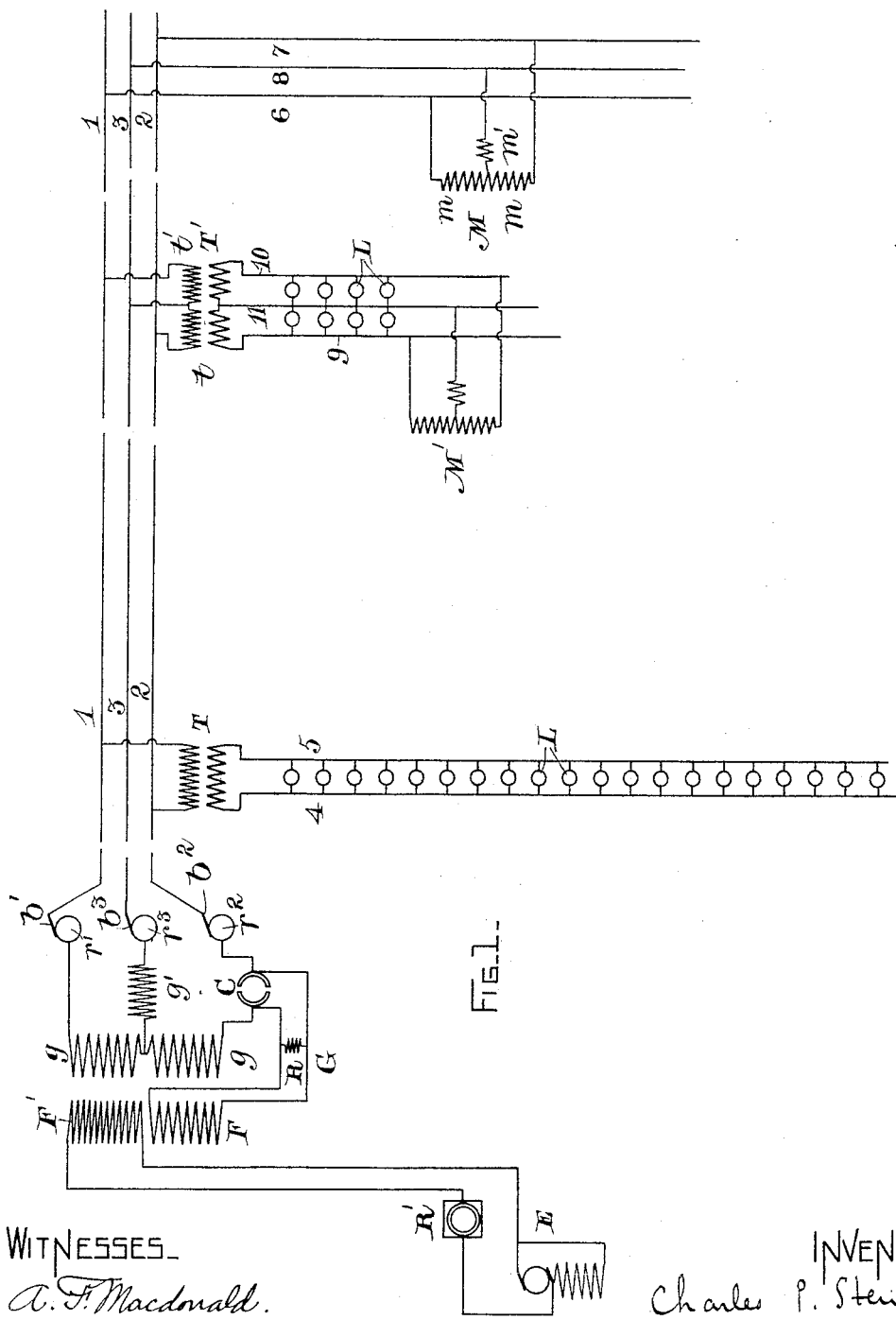

(No Model.) 3 Sheets—Sheet 1.
C. P. STEINMETZ.
SYSTEM OF ELECTRICAL DISTRIBUTION.
No. 533,248. Patented Jan. 29, 1895.

WITNESSES
A. F. Macdonald.
B. B. Hull.

INVENTOR
Charles P. Steinmetz
By Geo. R. Blodgett
Atty.

(No Model.) 3 Sheets—Sheet 2.

C. P. STEINMETZ.
SYSTEM OF ELECTRICAL DISTRIBUTION.

No. 533,248. Patented Jan. 29, 1895.

WITNESSES—
T. J. Johnston
A. F. Macdonald

INVENTOR—
Charles P. Steinmetz,
by Geo. B. Blodgett,
Atty.

(No Model.) 3 Sheets—Sheet 3.

C. P. STEINMETZ.
SYSTEM OF ELECTRICAL DISTRIBUTION.

No. 533,248. Patented Jan. 29, 1895.

WITNESSES
A. F. Macdonald.
S. J. Johnston.

INVENTOR
Charles P. Steinmetz by
Geo. R. Blodgett,
Atty.

UNITED STATES PATENT OFFICE.

CHARLES P. STEINMETZ, OF SCHENECTADY, NEW YORK, ASSIGNOR TO THE THOMSON-HOUSTON ELECTRIC COMPANY, OF BOSTON, MASSACHUSETTS.

SYSTEM OF ELECTRICAL DISTRIBUTION.

SPECIFICATION forming part of Letters Patent No. 533,248, dated January 29, 1895.

Application filed September 24, 1894. Serial No. 523,920. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

This invention relates to improvements in systems of electrical distribution by alternating currents. The systems now in use for this purpose may be divided into single phase systems, in which the energy is distributed in the form of alternating single phase currents; and multiphase systems in which the energy is distributed by two or more alternating currents, differing in phase. My invention while partaking of the nature of both of these systems, is more closely related to the single phase system, as in the normal operation thereof the energy is transmitted by and in the form of single phase currents only. Associated with the mains carrying the single phase currents are one or more other mains which supply to any desired part of the system an alternating electro motive force which is out of phase with the electro motive forces on the mains carrying the aforesaid single phase currents. This main or mains in which the out of phase electro motive force is maintained, do not in the normal operation of the system supply energy to any substantial extent to the various parts of the system, but under certain abnormal conditions, will transfer energy from one part of the system to another. The out of phase main or mains may therefore be termed balance wires, as they act to some extent to maintain the balance of the system, but when the balance is effected they are substantially inactive so far as transmission of energy is concerned.

My invention therefore comprises a set of mains connected to and supplied by a source of single phase alternating currents, and associated with this set of mains one or more balance wires on which is maintained an electro motive force out of phase with the electro motive forces on the single phase mains. At various parts of the system this third wire is connected with translating devices which require an out of phase electro motive force for their energization, for example, certain forms of alternating current motors. These motors have some of their coils connected across the single phase mains, and from these mains, in the normal operation of the motors, is derived the energy which actuates them. Other coils of the motors are connected to a balance wire and are supplied thereby with an out of phase electro motive force. In the normal operation of the system, that is, when the load throughout the system is normal, including the load on the motors, then the motors will derive substantially all their operating energy from the single phase mains, and the balance wire while maintaining an out of phase electro motive force on the coil to which it is connected does not supply any substantial amount of the energy which is converted into mechanical energy by the rotation of the motor. Under these circumstances the system becomes substantially a single phase system, and is capable of being regulated and of carrying single phase translating devices with the same facility as the ordinary single phase system. There being in such normal operation, only one wave or current or energy that is actually concerned in the production, distribution and conversion of the mechanical energy into electrical energy and back again, I have termed this system monocyclic.

Comparing this system with an ordinary multiphase system it is to be noted that in the multiphase system there are three or more mains carrying two or more alternating currents of different phase each of which supplies a substantial part of the energy required for the normal operation of the multiphase translating devices, and in general the energy transmitted is about equally divided between the several currents. In the case of the monocyclic system however, as herein described, only two of the mains and the single phase alternating current carried thereby, are instrumental in the distribution or transmission of energy in the normal operation of the system. The other main or mains in such normal operation supply simply an out of phase electro motive force but do not have any substantial part in the actual transfer of energy. This result I accomplish by adjusting the relation between the impressed electro motive forces, counter electro motive forces and resistances, both inductive and non-inductive, of the several circuits. In an ordinary multiphase system this relation is such that in the normal operation of the multiphase translating devices the counter electro motive force developed in each branch or circuit in such devices is considerably less than the impressed electro motive force existing in such branch or circuit. The consequence of this is that in each of such circuits a current will flow, consuming energy, and this energy is drawn from all of the mains. In the monocyclic system however, as herein described, the impressed electro motive force in one or more of the branches or circuits of the translating devices is made substantially equal to the counter electro motive force which is generated in such branch or circuit in the normal operation of the devices, consequently practically no current will flow in such branches or circuits, the electro motive forces therein being practically balanced. Under variations of load above or below the normal, this balance will no longer exist and the balance wire will then be traversed by a current. Thus in the case of an over-load on the device in question, the counter electro motive force will fall below the impressed electro motive force in the branch connected to the balance wire so that a current will result in the direction of the impressed electro motive force, that is, the device will absorb energy from the balance wire. On the other hand, in the case of an abnormally light load on the translating device the counter electro motive force in such device will rise above the impressed electro motive force and current will flow in the direction of the counter electro motive force, thus supplying energy to the balance wire. The balance wire thus acts as a possible means for transferring and equalizing the load throughout the system.

The out of phase electro motive force on the balance wire may be derived from the same machine that supplies the alternating current to the single phase mains, or it may be derived from a separate machine. It is in fact immaterial what means are employed to maintain the out of phase electro motive force—whether it is by the action of a source associated with the main source of single phase current—or of a source entirely distinct therefrom, or by the action of one or more of the translating devices themselves. Thus as I will hereinafter point out, certain classes of translating devices, such as motors having displaced coils, are capable of supplying the out of phase electro motive force by their normal operation, while deriving their operating energy from the single phase mains.

The invention lies not so much in the type or arrangement of apparatus employed, as in the proportioning of the forces acting therein, and of the resistances opposed to such forces, so as to bring about a normal condition of static equilibrium or balance, as regards the balance wire and the parts immediately connected therewith.

Figure 2:
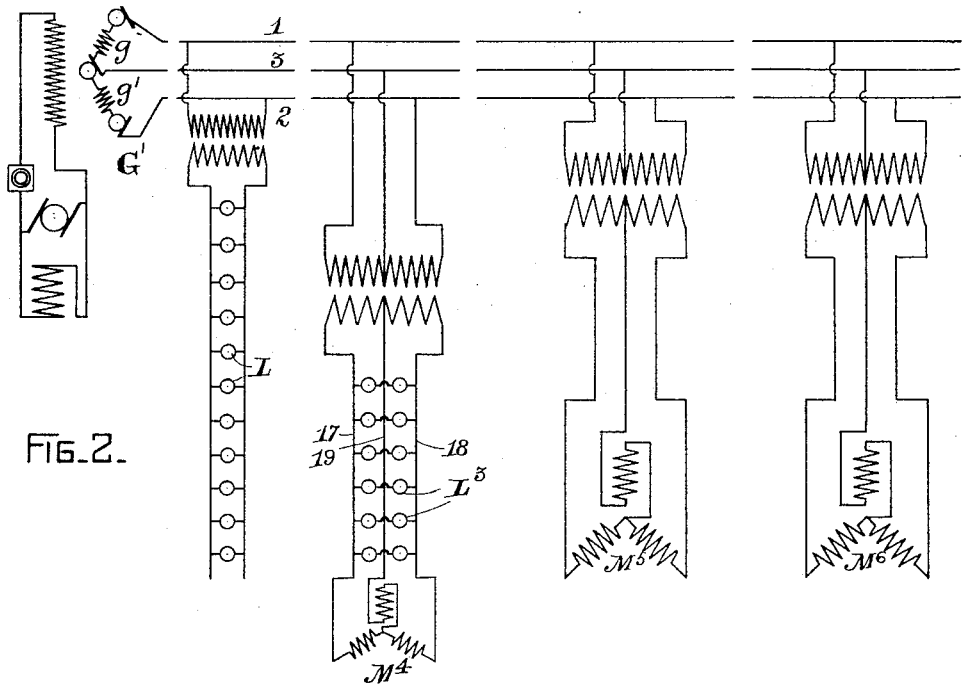
Figure 3:
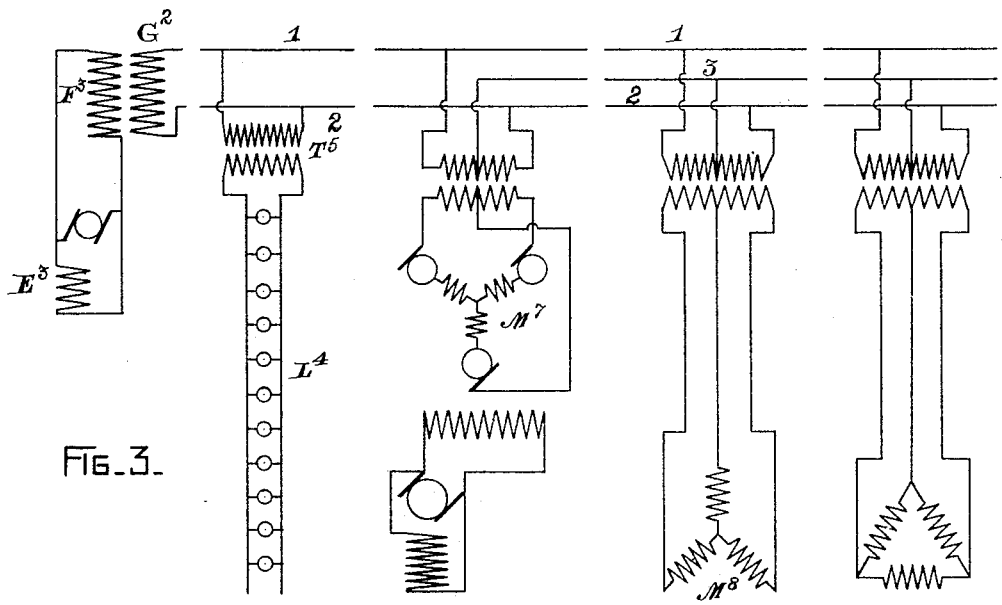
Figure 4:
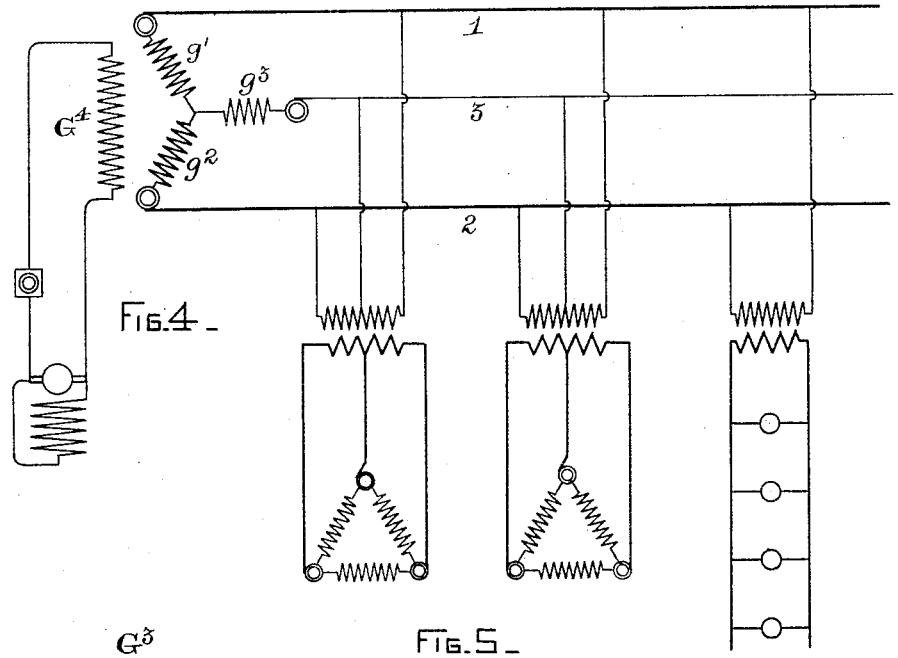
Figure 5:
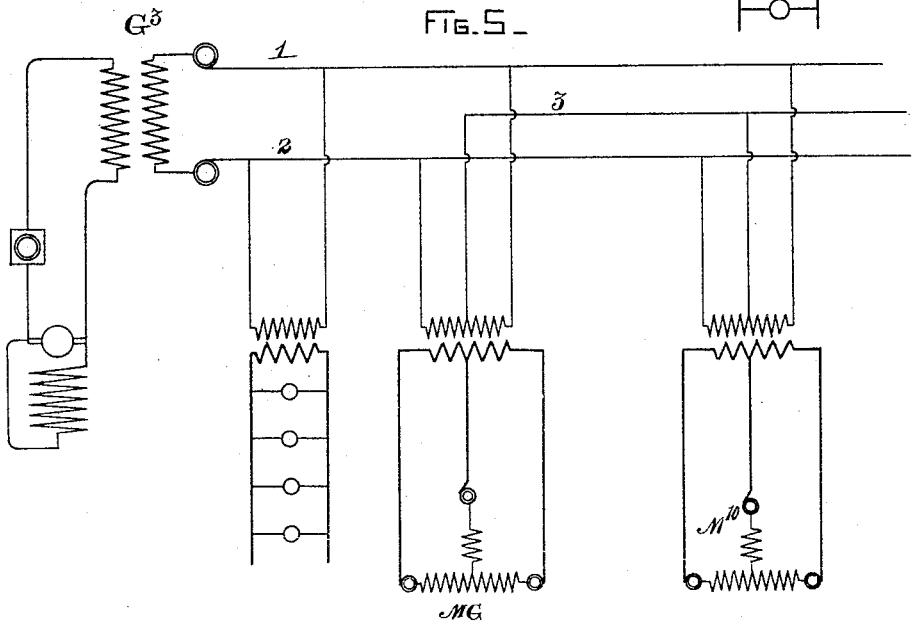

Figure 1 is a diagram of a system of distribution to which my invention is applicable, the source of out of phase electro motive force being shown as additional to, but associated with, the main source of single phase alternating currents. Fig. 2 is a diagram of a system similar to that shown in Fig. 1, the out of phase electro motive force however, being derived directly from the main source of alternating single phase currents. Fig. 3 is a diagram of a system of distribution in which the out of phase electro motive force is obtained, not from a source of electric energy, but, by the action of the translating devices themselves. Fig. 4 illustrates the application of the invention to a system in which the electro motive forces are one hundred and twenty degrees apart in phase. Fig. 5 shows a system in which the electro motive force is supplied by a motor-generator, at a distance from the source of the single phase currents.

In Fig. 1, G is an alternating generator having a main armature coil $g$, whose ends are connected to collector rings $r'\ r^2$. Associated with this main coil is an additional coil $g'$, which is angularly displaced, (preferably ninety degrees) with reference to the main coil, and is connected at one end to an intermediate portion of the main coil and at its other end to a third collector ring $r^3$. Brushes $b'\ b^2$ bearing on collector rings $r'\ r^2$, are connected to single phase mains 1 2. A brush $b^3$ bearing on collector ring $r^3$, is connected to a third wire 3. The generator G is shown as compound wound, having one field coil F included directly in the single phase circuit through a rectifying commutator C, a resistance R shunting the break of the commutator to prevent sparking. The other field coil F' is energized by a separate exciter E, having a regulating rheostat R' connected to the exciting circuit of said field coil and serving for manual regulation of the potential on the single phase mains 1 and 2 in accordance with the load on the said mains.

The mains 1 and 2 lead to a point or points at a greater or less distance from the generator G and are connected to and supply translating devices. The potential on these mains being in general very high, it is of course desirable to insert potential reducing transformers between the mains and the translating devices.

4 5 indicate a branch or sub-circuit containing single phase translating devices L and supplied with a single phase current through a transformer T connected directly across the single phase mains 1 2. Of course in practice there would be usually a large number of such single phase branch circuits connected to the mains at different points. With reference to such single phase branch circuits the system acts in every respect like an ordinary single phase system, and change of load on such single phase circuits is adjusted for by the compounding action of the series coil of the generator and by manual regulation of the separate exciter circuit precisely as with the ordinary single phase system. The energy required for the operation of these single phase translating devices is derived altogether from the main generating coil $g$ of the generator G. The supplementary coil $g'$ however, at the same time generates an electro motive force which is out of phase with the electro motive force generated in the main coil, and there are thus developed between the third wire 3 and the respective mains 1 and 2 electro motive forces which are the resultants of the forces generated in the supplementary coil, and in the two portions of the main coil, and these electro motive forces will be different in phase from one another, and from that existing between mains 1 and 2.

At one or more points of the system connections are made to translating devices, such as transformers or motors, which require for their operation, out of phase electro motive forces. Thus connections 6 and 7 are shown leading from mains 1 and 2, and connection 8, from third wire 3, to induction motor M, having an inducing winding with main and supplementary coils similarly arranged to those of the generator G, the single phase lines 6 and 7 leading to the main coil $m$ of the motor, and the balance wire connection 8 leading to the supplementary coil $m'$ thereof. These coils may be supposed to act on a closed circuited armature in the usual manner—and when the motor is started from rest, the out of phase electro motive forces supplied to its angularly displaced coils will furnish the torque required for starting. When the motor is running a counter electro motive force is developed in all of its coils, and the counter electro motive force developed between lines 6 and 8 and between lines 7 and 8 will be the resultant of the counter electro motive forces generated in the main and supplementary coils $m$, $m'$. The direction and magnitude of the current flowing in the several branches or circuits, of the motor, depends on the relation between the impressed and the counter electro motive forces in the respective branches or circuits. By properly proportioning the windings of the generator, or of the motor, or by properly adjusting the impedance of the several circuits, the effective impressed and counter electro motive forces in any one of the branches can be made substantially equal, when the motor is running at normal speed and load. Thus in the case of the motor M, the coil $m'$ may have a relatively high resistance or a high self induction, so as to relatively diminish the effective impressed electro motive force, or it may have a greater inducing effect, relatively to the main coil than is the case with the corresponding coil of the generator, or the third wire 3 and connections may be of relatively high impedance. Any arrangement or adjustment, in fact, may be adopted that will bring up the counter electro motive force or depress the impressed electro motive force in the coil $m'$ so as to make them substantially equal—in the normal operation of the motor—while preserving the necessary excess of impressed over counter electro motive force in the other coil or coils—so as to enable the necessary flow of current in the last named coils, for the operation of the motor. I have illustrated and described this peculiar form of induction motor, simply as one of a variety of arrangements in which the invention of this application may be embodied; but as appears herein, the invention may also be embodied equally well in a variety of other arrangements, and I make no special claim to the construction of the induction motor, since I regard this as a distinct invention, which will be claimed in another application for Letters Patent, Serial No. 529,415, filed November 20, 1894.

The motor M is shown directly connected to the mains and third wire, but it is obvious that tension reducing transformers may be included in the connections if desired. If the motor is adapted to the same phasal relation of electro motive forces as are developed by the generator G, the transformers may be arranged as indicated at T', two transformers $t$ and $t'$ having their primary windings connected respectively between the main 1 and the third wire 3 and the main 2 and said third wire. Their secondaries are similarly connected to lines 9, 10 and 11 leading to motor M', which is similar in construction and operation to motor M, the windings being so proportioned that, in the normal operation of the motor, the counter electro motive force developed in the coil connected to third wire 11 is substantially equal to the electro motive force impressed thereon. I have also shown single phase translating devices L connected across in the circuits 9, 11 and 10, 11. With respect to these translating devices, the wire 3 acts substantially as a balance wire, like the third wire of an ordinary three wire system.

The operation of the system is as follows:— The generator G develops between the mains 1 and 2 a single phase alternating electro motive force which alone is effective in the operation of the single phase translating devices connected across said mains. At the same time there are generated between the third wire 3 and the mains 1 and 2, electro motive forces out of phase with one another, and with that between mains 1 and 2. Such electro motive forces, delivered to the motors, enable the same to be started from rest under load and to be brought up to normal speed. The counter electro motive force thus developed in the branch of the motors, which is connected to the third wire, then becomes substantially equal to the impressed electro motive force in such branch, while the counter electro motive forces in the branches connected to the single phase lines remaining less than the impressed electro motive force from said mains—current will flow from the mains sufficient for the normal operation of the motors. If then any motor becomes overloaded the counter electro motive force in its out of phase branch will fall below the impressed electro motive force, and energy will again be delivered to the motor through the third wire until the overload is removed. This extra energy will be derived either from the generator, or from any other motor which is connected to the same system and is not equally overloaded; and if any one of the motors is underloaded, the counter electro motive force in its out of phase branches will rise above the impressed electro motive force and the motor will deliver energy to the third wire, such energy being derived from the single phase mains. Thus the third wire under such abnormal conditions will transfer energy between the motors and the generator—and between the several motors—acting as a balance wire for the whole system. It will be seen that the third wire 3 acts in relation to all the devices to which it is connected, as a possible means of supplying energy when needed, or of transferring surplus energy from one part of the system to other parts, and this energy is of course supplied and transferred by and in the form of alternating currents, out of phase with those on the single phase mains. Such currents are however, comparatively small and incidental, compared with the current on the single phase mains—and would generally be momentary, or at least of short duration. The third wire may therefore be comparatively small in cross section. The main advantage of the system however, lies in the fact that, owing to the relative unimportance of the incidental currents flowing on the third wire, the generator may be regulated solely with a view to the maintaining of proper potential on the single phase mains—and these mains alone being substantially concerned in the transmission of the energy—the difficulty of balancing up the load between several circuits does not arise.

In Fig. 2 is represented a system of distribution wherein the generator $G'$ has two sets of angularly displaced coils $g\ g'$, which taken together, in series, develop a resultant single phase of electro motive force on the mains 1 and 2—while acting individually they produce out of phase electro motive forces between main 1 and third wire 3, and between main 2 and third wire 3. The generator is shown as separately excited with means for manual regulation—but it will be understood that it may be compound wound like the generator indicated in Fig. 1. Single phase translating devices L may be supplied by transformers connected directly across the single phase mains. I have indicated the generator coils as displaced sixty degrees, giving sixty-degree angle of phase difference between circuits 1, 3, and 2, 3. From these electro motive forces sixty degrees apart appropriate transformers may develop any desired phase relation,—or the electro motive forces may be applied to motors especially adapted to work with this particular phase relation. Thus I have indicated motors $M^4$, $M^5$, $M^6$, with reversed coils connected to the third wires of the several sub-circuits. In each case however, the windings and impedance are so proportioned as to give an approximate balance between the counter and impressed electro motive forces when the motor is in normal operation. The sub-circuit 17, 18, 19, containing motor $M^4$, is also shown as containing lamps $L^3$ connected across the single phase sub-mains.

The out of phase electro motive force, in the system shown in Fig. 1, is derived from a source supplementary to, but associated with, the source of single phase current. In the system shown in Fig. 2, the out of phase electro motive force is derived from the same coils that generate the electro motive force on the single phase mains. It matters not, however, how this out of phase electro motive force is developed—whether it comes from the same machine as the single phase currents, or from another machine.

If the out of phase electro motive force comes from a separate machine from that generating the single phase current, such separate machine may be either a generator or a motor, that is, it may derive its operating energy either from a separate and additional source of power, or from the single phase lines themselves. In fact, in the system above explained, each motor connected to the system acts to generate in the third wire connections an out of phase electro motive force, opposite and approximately equal to that impressed by the generator. It therefore becomes obvious that we may omit the connection of the third wire to the generator, leaving it to connect only the motors among themselves. The third wire will then still act as a balance wire among the several motors. Such a system is represented in Fig. 3, wherein $G^2$ is the generator which in this case would be of the strict single phase type, delivering a single phase alternating current to mains 1, 2, and having its field coil $F^3$ excited by separate exciter $E^3$. Means for automatic or manual regulation may be provided, as before, to regulate the potential on the single phase mains, in accordance with the load thereon. Single phase translating devices $L^4$ are supplied by said mains, through potential reducing transformers, as indicated at $T^5$. Two or more alternating motors $M^7$ $M^8$ have a part of their coils connected across the single phase mains, and their other coils which are angularly displaced with reference to the former—are connected together by the third wire 3. In said figure, these connections are effected, in each case, through the intervention of transformers. In case the motors are adapted to operate with similar phase relations these transformers may be of the kind indicated in Fig. 3, being similar to the transformer arrangement shown at $t\,t'$, Fig. 1. It will now be seen that the multiphase motors, so arranged, will serve to maintain, when in normal operation, an out of phase electro motive force between the lines 1 and 3, and 2 and 3. Furthermore, any one of the motors having been started, it will supply the out of phase electro motive force required for starting any one of the other motors—a momentary out of phase current flowing through the third wire until the motors reach the normal relation of speed. Transfer of energy between the several motors will take place in accordance with the variations of load on same, as above explained. The first motor of the system to start in operation must of course be started by some extra means or special means, but such not being a part of my invention, and there being various well known ways of accomplishing it, I have not shown any special means for this purpose. The out of phase electromotive forces may also be generated at a point distant from the source of single phase currents, by a generator or a motor-generator, located at such distant point and connected to the mains and to the balance wire—the latter being in that case, connected to the various multiphase translating devices, but not connected back to the generator. Thus in Fig. 5, I have shown a system of distribution in which mains 1, 2, supplied with single phase current by generator $G^3$, are connected also to the coils of a generator or motor-generator M G—at a distance from the generator $G^3$. The machine M G may be driven by an independent source of power, so as to constitute a generator, or it may derive its operating energy from the single phase mains. It is connected to balance wire 3, arranged to generate out of phase electro motive forces between the mains 1 and 2 and balance wire 3. Alternating current translating devices, such as motor $M^{10}$ are connected to said mains and balance wire, and the normal condition of said balance wire is one of equilibrium, as before.

My invention is readily applicable to the ordinary three phase system—by properly proportioning the resistances or impedances of the several circuits, or by making the several coils of the generators or of the motors, slightly unequal in effect. Such a system is shown in Fig. 4—$G^4$ being a three phase generator, connected to mains 1, 2, 3. Single phase translating devices are included between two of the mains 1 and 2—and multiphase devices are connected to said mains and also to the third wire 3. The condition of balance on this third main may be effected by making the coil $g^3$ of the generator which is connected thereto, of less effect than the coils $g'\ g^2$ connected to mains 1 and 2, or it may be accomplished by making the third main 3 of high resistance, or as indicated in the drawings, both of these expedients may be adopted in the same system.

It will be understood that when I have used the term "connected" in this specification, it must be taken in a broad sense, as including connections through transformers, as well as direct connections.

While I have spoken of the translating devices which are connected to both the mains and the balance wire as "multiphase" translating devices—I wish it to be understood that they are not multiphase except as respects the electro motive forces acting therein. The translation of energy is substantially of a single phase character—and the devices are, strictly speaking, when used according to my invention, single phase translating devices—generating out of phase electro motive forces—and this is the sense in which the term "multiphase translating devices" is herein intended.

It is obvious that where I have shown two mains, any number of mains may be understood, and similarly a third wire may be typical of any number of balance wires, which may be associated with the same or with different mains.

What I claim as new, and desire to secure by Letters Patent of the United States, is—

1. In a system of electrical distribution the combination of single phase mains, carrying a single phase alternating current—a third wire — means for developing between said third wire and mains, electro motive forces out of phase with that on the single phase mains, and translating devices connected across said single phase mains and also connected to said third wire—the energy required for the normal operation of such translating devices being derived substantially from said single phase mains.

2. The combination with a multiphase translating device of single phase mains connected thereto and supplying same with substantially all of the energy required for its normal operation—and a third wire also connected to said multiphase translating devices and impressing thereon an alternating electro motive force, out of phase with that on the single phase mains, but supplying substantially no energy to said translating device, in the normal operation thereof.

3. In a system of electrical distribution the combination of single phase alternating mains, one or more balance wires, between which and said mains, alternating electro motive forces are maintained out of phase with the electro motive force on said mains, and multiphase translating devices having coils connected to said single phase mains, and deriving therefrom substantially all the energy required for the normal operation of the devices—and having other coils angularly displaced with reference to aforesaid coils—and connected to said third wire, but deriving substantially no energy therefrom in such normal operation.

4. The combination of two or more multiphase devices, which in their normal operation, develop in different portions thereof—electro motive forces of different phase, of single phase mains connecting portions of said devices and serving for the normal transfer of current to or from the same—and a balance wire connecting other parts of such devices of different phase of electro motive forces, the electro motive forces in said balance wire being, in the normal operation of the devices, substantially balanced.

5. The method of operating multiphase translating devices which consists in supplying to some of the coils thereof, a single phase alternating current of sufficient energy for their normal operation, causing said current to induce in other coils of said devices, electro motive forces out of phase with the electro motive force of such single phase current, and impressing on such other coils, an alternating electro motive force opposed and substantially equal to the counter electro motive force developed in the normal operation of the devices.

6. The method of operating multiphase translating devices which consists in supplying to a portion of such device, by a single-phase current, energy sufficient for the normal operation thereof—and maintaining on another portion of such device an electro motive force out of phase with that of said current.

7. The method of operating a multiphase translating device having different portions or branches in which, in normal operation, counter electro motive forces of different phase are developed, which consists in impressing on said different portions or branches, electro motive forces respectively opposed to said counter electro motive forces, the impressed electro motive force being greater than the counter electro motive force in one or more of the portions—and substantially equal to the counter electro motive force in another portion.

8. The combination with two or more multiphase devices, each having relatively displaced coils, of mains connecting corresponding coils in the several devices and serving for the normal transfer of energy to or from the same—and a third wire connecting coils displaced relatively to aforesaid coils—the electro motive forces developed by said devices in said third wire being opposed, and approximately equal in the normal operation of the devices.

9. The combination with a multiphase motor having relatively displaced coils, of single phase mains connected to a portion of said coils—and supplying substantially all of the operating energy of the motor in the normal operation thereof—and a third wire connected to a portion of said coils displaced relatively to aforesaid portion and impressing thereon an electro motive force substantially equal to the counter electro motive force developed therein, in the normal operation of the motor.

10. In a system of electrical distribution the combination of single phase mains, carrying a single phase alternating current—a third wire—means for developing between said wire and mains, electro motive forces out of phase with that on the single phase mains, single phase translating devices supplied by said mains, and multiphase translating devices connected across said single phase mains and also connected to said third wire—the energy required for the normal operation of such multiphase translating devices being derived substantially from said single phase mains.

11. In a system of electrical distribution the combination of single phase mains, single phase translating devices connected across said mains, a generator of single phase alternating currents connected to said mains, means for regulating said generator in accordance with the load on said single phase mains, a third wire, means for developing between said third wire and mains, electro motive forces out of phase with that between said mains, and multiphase translating devices connected across said mains and deriving substantially their whole normal operating energy therefrom, and also connected to said third wire.

12. In a system of electrical distribution in which single phase and multiphase devices are connected to the same mains, the method of distribution which consists in supplying through said mains, single phase alternating currents of sufficient energy for the normal operation of all such devices—and regulating the potential on said single phase mains in accordance with the load thereon.

13. The combination of three or more lines, means for supplying said lines with out of phase electro motive forces, translating devices connected to said lines and generating out of phase counter electro motive forces, the ratio of counter electro motive force to impressed electro motive force being less on one or more of said lines than it is on the others.

14. In a system of electrical distribution the combination of three or more lines, means for developing between said lines out of phase electro motive forces, a translating device having different portions in which out of phase electro motive forces are generated, such portions being connected respectively to said lines, and the ratio of counter electro motive force to impressed electro motive force being less in one or more of the portions than it is in the others.

In witness whereof I have hereunto set my hand this 19th day of September, 1894.

CHARLES P. STEINMETZ.

Witnesses:
B. B. HULL,
J. LE D. LANGDON.